W. C. HACKMAN.
SOLDERING IRON ATTACHMENT FOR ACETYLENE TORCH HEADS.
APPLICATION FILED AUG. 12, 1921.
1,428,956.
Patented Sept. 12, 1922.
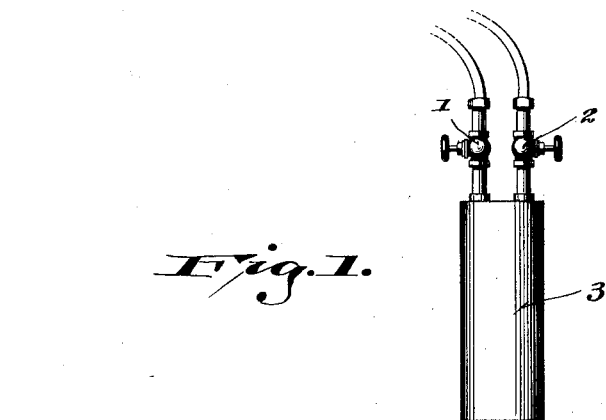
Fig. 1.
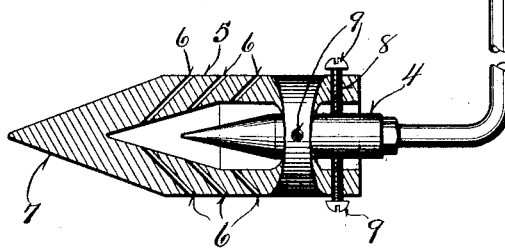
Fig. 2.
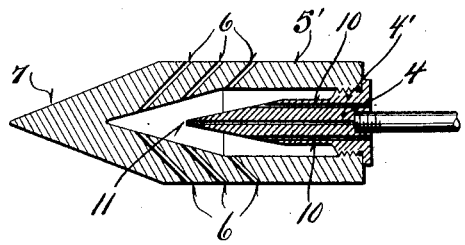
Inventor:
William C. Hackman
By Young & Young
Attorneys
Witness:
Robert E. Weber Patented Sept. 12, 1922.

1,428,956

UNITED STATES PATENT OFFICE.

WILLIAM C. HACKMAN, OF MILWAUKEE, WISCONSIN, ASSIGNOR OF ONE-HALF TO MAX ZINKE, OF MILWAUKEE, WISCONSIN.

SOLDERING-IRON ATTACHMENT FOR ACETYLENE-TORCH HEADS.

Application filed August 12, 1921. Serial No. 491,756.

*To all whom it may concern:*

Be it known that I, WILLIAM C. HACKMAN, a citizen of the United States, and resident of Milwaukee, in the county of Milwaukee and State of Wisconsin, have invented certain new and useful Improvements in Soldering-Iron Attachments for Acetylene-Torch Heads; and I do hereby declare that the following is a full, clear, and exact description thereof.

My invention refers to acetylene gas torches and it has for its primary object to provide a simple, economical and effective attachment to the torch head, whereby the same may be used as a soldering iron, which iron is maintained at a uniform soldering temperature, due to the regulation of the flow of gas through the torch head.

With the above and other minor objects in view, the invention consists in certain peculiarities of construction and combination of parts, as are hereinafter set forth with reference to the accompanying drawings and subsequently claimed.

In the drawings:

Figure 1 represents an elevation of a standard type of torch head fitted with a soldering iron attachment, embodying the features of my invention, the soldering iron being partly in section to more clearly show certain structural features, and Figure 2 is a longitudinal sectional view through an acetylene burning torch head, having attached thereto a soldering iron also conforming to my invention.

Referring by characters to the drawings, 1 and 2 represent the valves for controlling air and gas to the mixing chamber 3 that is in pipe connection with a standard acetylene gas burning torch head 4. In this exemplification of my invention, I have illustrated a shell-like soldering iron 5 having vent apertures 6 therein near its forward tapered nose 7. The rear end of the shell, in this case, is open to form an air intake about the torch head. The shell body is provided with companion pairs of screw threaded apertures 8, which are adapted to receive locking bolts 9, the companion sets of locking bolts being positioned at a right angle to each other and upon different planes. These locking bolts thus form means of securely attaching the soldering iron shell to the body of the torch head, whereby the same may be accurately aligned and adjusted properly with relation to the point of discharge of the gas to the internal tapered bore of said shell.

Figure 2 represents another form of my invention wherein the acetylene torch head 4 is provided with a threaded end 4' for threaded engagement with the internal bore of the soldering iron shell body 5'. In this exemplification of my invention, air is introduced into the chamber of the soldering iron through the torch head by means of ports 10—10 that extend through the head paralleling the gas discharge duct 11. Thus it will be seen in both of these forms that the soldering iron shell can be detached from the torch head, when said torch head is to be used in the ordinary manner, and it follows that the soldering iron shell can readily be adjusted over the head when a job of soldering is required.

Obviously, the air and gas valves will control the amount of fuel vapor accurately, whereby the temperature of the soldering iron can be maintained uniformly for indefinite periods, or as long as the supply of gas is fed to the inner chamber of the soldering iron.

While I have shown and described two forms of my invention, obviously I may, without departing from the spirit of it, vary the structural features within a fair interpretation that a skilled mechanic would put upon the claim.

I claim:

A soldering iron attachment for acetylene torch heads comprising a torch head, a forwardly vented shell iron chambered and having a tapered nose fitted over the nose of said torch head, said nose terminating adjacent the forward end of the chamber for introducing air to the soldering iron chamber about the torch head, said shell having a thick wall with two pairs of openings therein, each pair of openings lying in a different plane, and a bolt in each of said openings, whereby said shell may be adjusted in all directions with respect to said head.

In testimony that I claim the foregoing I have hereunto set my hand at Milwaukee, in the county of Milwaukee and State of Wisconsin.

WILLIAM C. HACKMAN.